US012631253B2

(12) United States Patent
Bender et al.

(10) Patent No.: US 12,631,253 B2
(45) Date of Patent: May 19, 2026

(54) BELLOWS WITH CONTROLLED SHIFT OF MEAN EFFECTIVE DIAMETER

(71) Applicant: EATON INTELLIGENT POWER LIMITED, Dublin (IE)

(72) Inventors: Steven Paul Bender, Attleboro, MA (US); Edward Nicholas Ruggeri, Westport, MA (US); Jeffrey Robert Lavin, Mattaposett, MA (US); Michael Christopher Petrarca, Coventry, RI (US); Gerald Maurice Berard, North Providence, RI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 63 days.

(21) Appl. No.: 18/407,697

(22) Filed: Jan. 9, 2024

(65) Prior Publication Data

US 2024/0229932 A1 Jul. 11, 2024

Related U.S. Application Data

(60) Provisional application No. 63/440,302, filed on Jan. 20, 2023, provisional application No. 63/438,463, filed on Jan. 11, 2023.

(51) Int. Cl.
*F16J 3/04* (2006.01)

(52) U.S. Cl.
CPC .................................... *F16J 3/047* (2013.01)

(58) Field of Classification Search
CPC .... F16J 3/047; F16J 15/52; F16J 15/34; F16J 15/3452; F16J 15/36; F16J 15/363
See application file for complete search history.

(56) References Cited

U.S. PATENT DOCUMENTS

| | | | | |
|---|---|---|---|---|
| 781,939 | A * | 2/1905 | Fulton .................... | B65D 88/02 220/667 |
| 1,830,780 | A * | 11/1931 | Brennan ................. | F16K 41/10 29/454 |
| 2,877,994 | A * | 3/1959 | Jones ....................... | F16J 15/52 366/326.1 |
| 2,925,829 | A * | 2/1960 | Thompson, Sr. ....... | F15B 15/10 29/454 |
| 3,030,983 | A * | 4/1962 | Hamren .................. | F16J 3/047 92/34 |
| 3,977,685 | A | 8/1976 | Greenawalt et al. | |
| 4,340,089 | A * | 7/1982 | Freiherr von Arnim .................... F16J 3/047 138/121 | |
| 4,744,569 | A * | 5/1988 | Wentworth, Jr. ........ | F16J 3/047 277/379 |
| 5,261,317 | A * | 11/1993 | Fraser, Jr. ................ | F16J 3/047 92/45 |
| 8,474,826 | B2 | 7/2013 | Villeneuve et al. | |

(Continued)

OTHER PUBLICATIONS

Extended European Search Report and Search Opinion issued for EP Application No. 24150875.3 on Jun. 10, 2024, 7 pages.

(Continued)

*Primary Examiner* — Christine M Mills
*Assistant Examiner* — L. Susmitha Koneru
(74) *Attorney, Agent, or Firm* — Merchant & Gould P.C.

(57) ABSTRACT

The present disclosure relates to a bellows seal arrangement having a bellows designed with a controlled shift in effective mean diameter when the bellows is exposed to a predetermined pressure.

31 Claims, 7 Drawing Sheets

(56) References Cited

U.S. PATENT DOCUMENTS

| | | | |
|---|---|---|---|
| 8,714,558 B2 | 5/2014 | Berard | |
| 9,683,583 B2 * | 6/2017 | Arikawa | F16J 3/047 |
| 9,958,092 B2 * | 5/2018 | Tatzreiter | F16J 3/047 |
| 10,677,358 B2 * | 6/2020 | Berard | F16J 15/3452 |
| 10,830,352 B2 * | 11/2020 | Arikawa | F16J 15/52 |
| 11,125,334 B2 | 9/2021 | Ruggeri | |
| 11,396,947 B2 | 7/2022 | Ruggeri | |
| 12,253,175 B2 * | 3/2025 | Caruana | F16J 3/047 |
| 2007/0210526 A1 * | 9/2007 | Basu | F16J 15/363 |
| | | | 277/359 |
| 2009/0285626 A1 * | 11/2009 | Chahine | F16L 51/028 |
| | | | 403/50 |
| 2013/0319649 A1 * | 12/2013 | Kim | B23K 37/003 |
| | | | 165/185 |
| 2014/0265146 A1 | 9/2014 | Danaher | |
| 2016/0108935 A1 * | 4/2016 | Arikawa | F15B 1/103 |
| | | | 92/47 |
| 2018/0031130 A1 * | 2/2018 | Berard | F16J 15/3452 |

OTHER PUBLICATIONS

European Office Action for European Patent Application No. 24150875.3 dated May 15, 2025, 6 pages.
European Office Action for European Patent Application No. 24150875.3 dated Oct. 13, 2025, 4 pages.

* cited by examiner

BELLOWS WITH CONTROLLED SHIFT OF MEAN EFFECTIVE DIAMETER

CROSS-REFERENCE TO RELATED APPLICATIONS

This application claims benefit to U.S. Provisional Application No. 63/438,463 filed on 11 Jan. 2023 and U.S. Provisional Application No. 63/440,302 filed on 20 Jan. 2023, which are hereby incorporated by reference.

TECHNICAL FIELD

The present disclosure relates to welded bellows sealing systems.

BACKGROUND

Face seals are used to provide sealing between a stationary housing containing a fluid such as oil, and a rotating shaft that passes through the housing. Dynamic sealing can be provided by a sealing ring that does not rotate relative to the housing, and a flange ring that rotates with the shaft. A welded bellows can be used to provide axial loading of the sealing interface between the flange ring and the sealing ring. Example bellows sealing arrangements are disclosed by US Patent Publication 2014/0265146 and U.S. Pat. Nos. 11,396,947 and 8,714,558. As disclosed by FIG. 3 of U.S. Pat. No. 8,714,558, the bellows sealing arrangements can include welded bellows manufactured from bellows plates each having an undulating (e.g., waved) configuration.

SUMMARY

One aspect of the present disclosure relates to a bellows seal assembly including a carrier and a sealing ring carried with the carrier. The sealing ring includes an axial sealing face adapted to oppose a rotational member. The bellows seal assembly also includes a bellows for applying sealing load to the sealing ring through the carrier. The bellows has an interior and an exterior. The bellows is configured to have a first mean effective diameter when a pressure applied to the bellows is below a mean effective diameter transition pressure. The bellows is also configured to have a second mean effective diameter when the pressure in the bellows is above the mean effective diameter transition pressure. The bellows includes bellows plates that each extend across a convolution span between first weld locations and second weld locations. The bellows plates are arranged in plate pairs with each plate pair including first and second plates connected at the first weld locations. Adjacent ones of the plate pairs are connected together at the second weld locations. The bellows are configured such that the first and second plates of each plate pair do not contact each other at a mid-span location when the bellows has the first mean effective diameter and do contact each other at the mid-span location when the bellows has the second mean effective diameter. The bellows is configured such that when the first and second plates of each plate pair contact one another at the mid-span locations first non-contact regions between the first and second plates of each plate pair are defined between the mid-span locations and the first welds and second non-contact regions between the first and second plates of each plate pair are defined between the mid-span locations and the second welds.

Another aspect of the present disclosure relates to a bellows seal assembly including a carrier and a sealing ring carried with the carrier. The sealing ring includes an axial sealing face adapted to oppose a rotational member. The bellows seal assembly also includes a bellows for applying sealing load to the sealing ring through the carrier. The bellows has an interior and an exterior. The bellows is configured with discrete mid-span contact locations configured to not contact when a pressure in the bellows is below a mean effective diameter transition pressure to cause the bellows to have a first mean effective diameter. The discrete mid-span contact locations are also being configured to contact when the pressure in the bellows is above the mean effective diameter transition pressure to cause the bellows to transition to a second mean effective diameter. The second mean effective diameter is larger than the first mean effective diameter.

Another aspect of the present disclosure relates to a method for designing a bellows seal assembly used with a pressure-generating system. The method includes designing a bellows with intentional mid-span contact locations between paired bellows plates of the bellow to cause the bellows to transition from a first mean effective diameter to a second mean effective diameter when the bellows is exposed to a pre-determined pressure. The bellows is designed such that the bellows is adapted to apply a customized first seal loading when the pressure-generating system is operating at a first phase in which a system pressure is below the predetermined pressure and is adapted to apply a customized second seal loading when the pressure-generating system is operating at a second phase in which a system pressure is above the predetermined pressure. The first and second seal loadings are customized by selection of a radial placement of the mid-span locations along a convolution span of the bellows.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
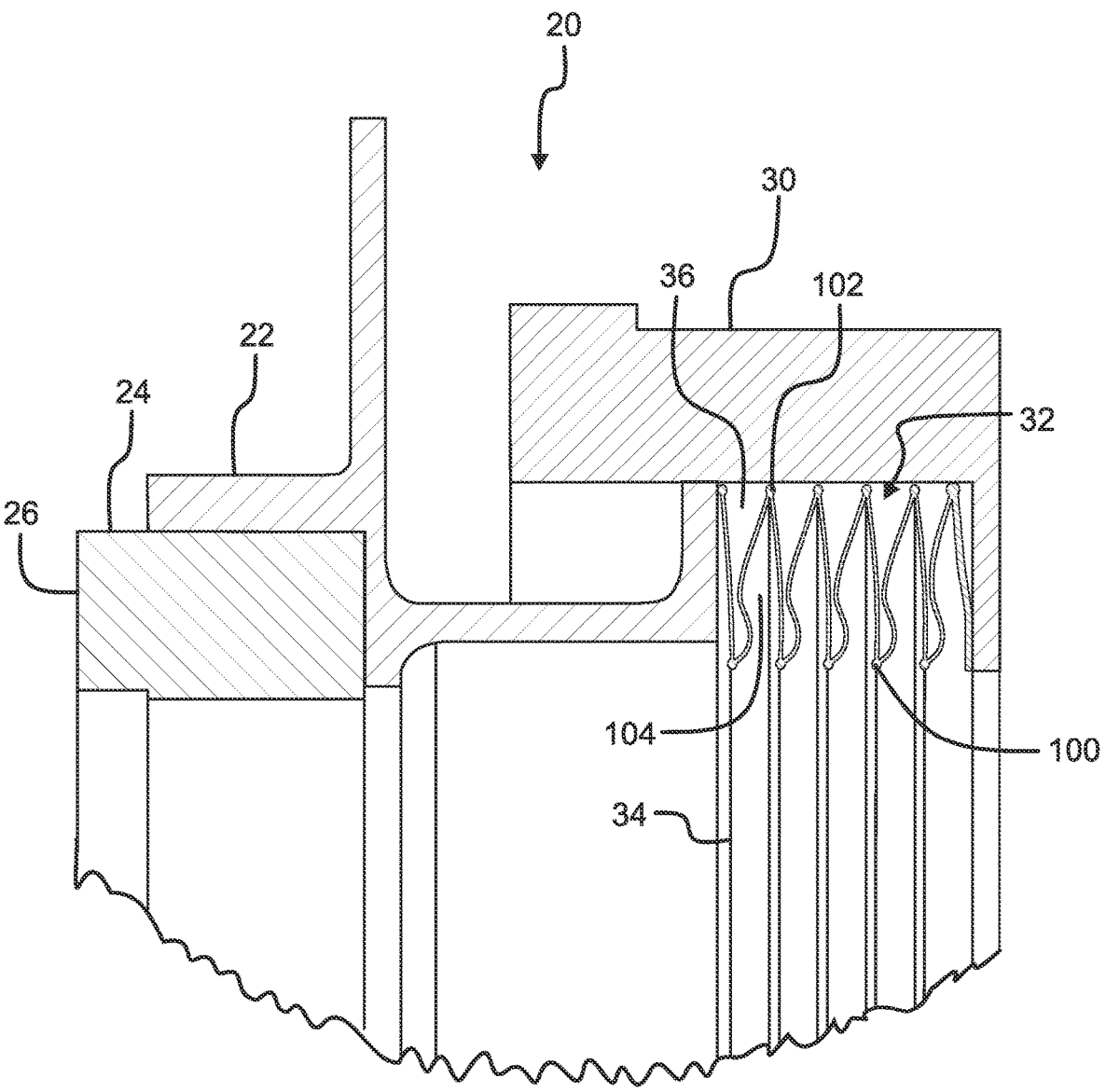
FIG. 1 is a cross-sectional view of a bellows seal assembly in accordance with the principles of the present disclosure.

One aspect of the present disclosure relates to a bellows (e.g., a welded bellows) designed to have a mean effective diameter that varies based on an internal pressure within the bellows. In certain examples, the variation of the mean effective diameter (MED) is customized to achieve different face seal loadings at different pressures within the bellows. It will be appreciated that a face seal loading is a loading where a sealing force from the bellows is applied in an axial direction (i.e., in a direction parallel to a central axis of the bellows). In preferred examples, aspects of the present disclosure are used within fluid seals (e.g., hydrodynamic seal) in which a dynamic rotor with grooves acts as a pump to create an air film upon which an opposing surface rides. In certain examples, the bellows is designed to operate at a first MED when the pressure within the bellows is below a transition pressure, and is designed to transition to a higher second MED when the pressure within the bellows exceeds the transition pressure. In certain examples, the first MED is selected such that when the pressure within the bellows is beneath the transition pressure (e.g., during start-up situations) the bellows applies a first face seal loading suitable for allowing the seal to effectively lift off and provide an air film. In certain examples, the second MED is selected such that when the pressure within the bellows is above the transition pressure (e.g., during normal operating conditions) the bellows applies a second face seal loading that is higher than the first face seal loading and is suitable for preventing the air film from becoming axially thicker than desired. In this way, a bellows designed with relatively low spring load characteristics can be used to accommodate applications having relatively high pressures.

To maintain a hydrodynamic fluid film at the sealing interface it is desirable to control contact loading while being exposed to high pressure differentials. This can be accomplished by utilizing MED characteristic of a bellows seal to control the seal face contact loading and reduce the stress level within the bellows diaphragms.

Typical high pressure bellows seals use thick foil diaphragms to be able to survive the high pressure environment but as a consequence provide significant increase in seal face contact loading that can reduce or eliminate the hydrodynamic fluid film during start-up situations. Using aspects of the present disclosure, thinner bellows diaphragms can be used in a way in which an effective hydrodynamic film is generated at slower speeds (e.g., at start up) and at higher speeds (normal operating conditions). This is possible by shifting the location of the MED based on the operating conditions of the system. The seal face contact loading generated by a bellows at a given pressure increases as the MED increases since the surface area on which the pressure within the bellows acts increases. This surface area is defined between the inner diameter ID and the MED. Thus, increasing the MED acts as a seal loading multiplier.

Figure 4:
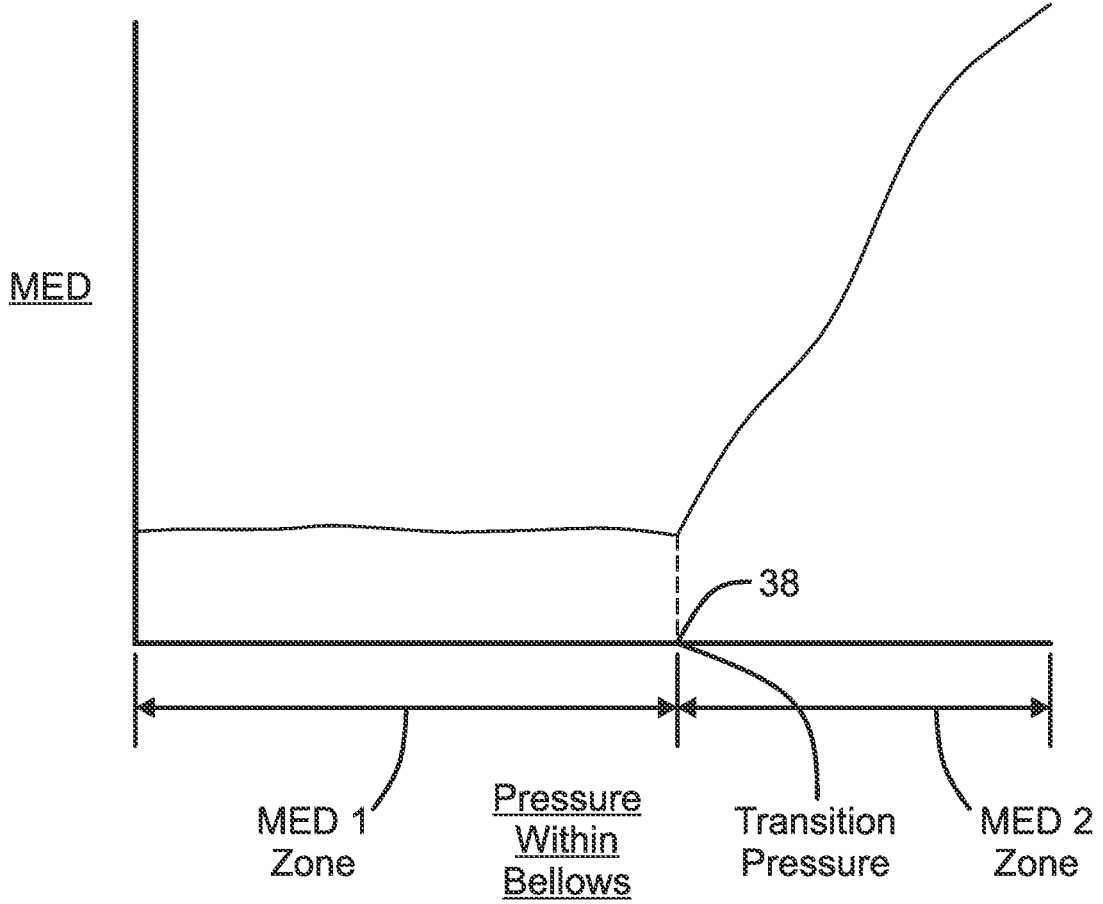
FIG. 4 is a graph depicting the MED of the bellows seal assembly of FIGS. 1-3 as the pressure within the bellows increases from below the MED transition pressure to above the MED transition pressure.
Figure 5:
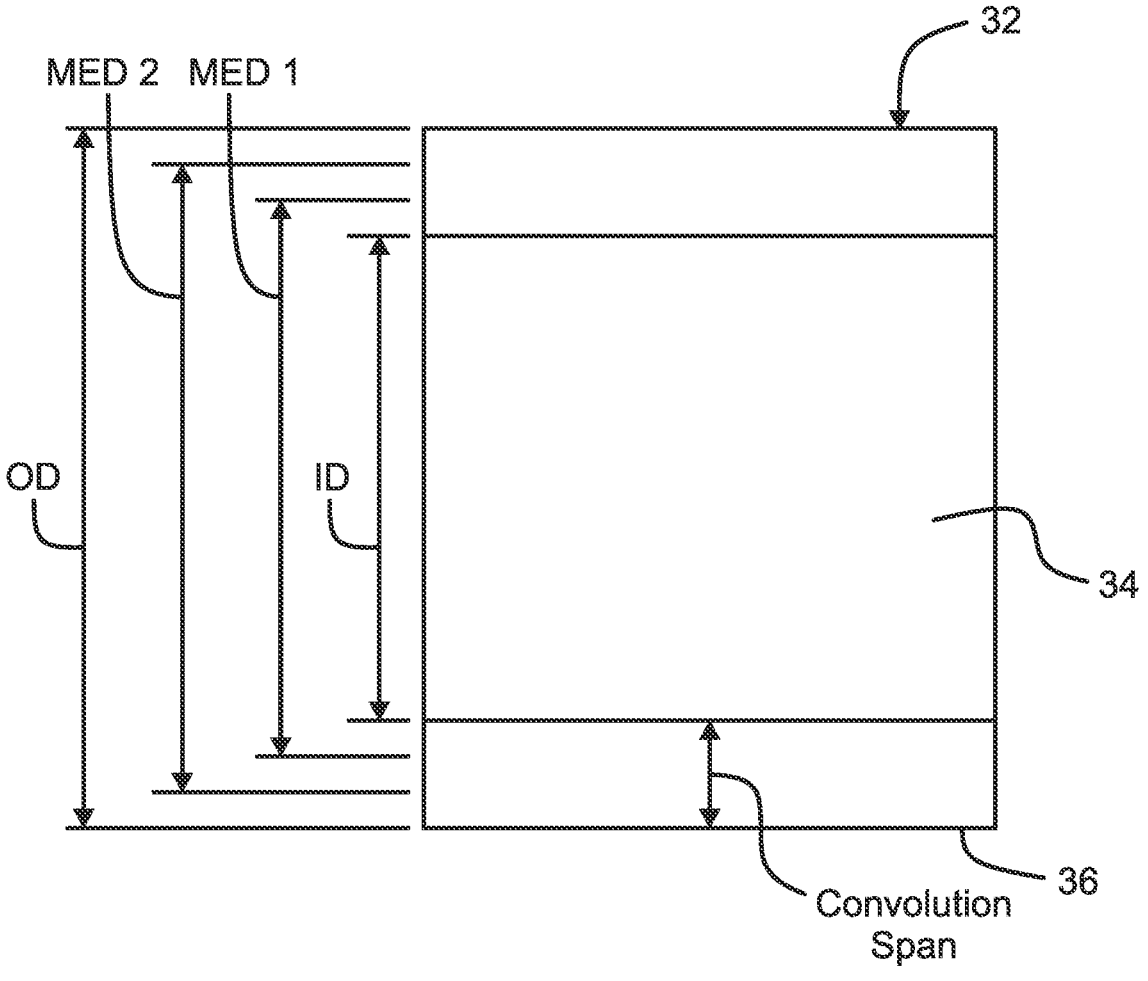
FIG. 5 schematically depicts the inner diameter, the outer diameter, the first mean effective diameter and the second mean effective diameter of the bellows.

FIG. 1 depicts a bellows seal assembly 20 in accordance with the principles of the present disclosure. The bellows seal assembly 20 includes a carrier 22 and a sealing ring 24 carried with the carrier 22. The sealing ring 24 includes an axial sealing face 26 adapted to oppose a rotational member (e.g., an opposing axial face of a flange secured to a shaft routed through the bellows seal assembly 20; an example shaft and flange are disclosed by U.S. Pat. No. 11,396,947, which is hereby incorporated by reference in its entirety). The axial face of the flange can include grooves for pumping air between the axial sealing face 26 and the axial face of the flange to provide a dynamic film of air (e.g., a hydrodynamic film/seal). Example grooves are disclosed by U.S. Pat. Nos. 11,125,334 and 8,474,826, which are hereby incorporated by reference in their entireties). The carrier 22 can be a shell including a cylindrical pocket for receiving the sealing ring 24. The carrier 22 can be telescopically mounted within a housing member 30. The bellows assembly 20 also includes a bellows 32 for applying axial sealing load to the sealing ring 24 through the carrier 22. The bellows 32 has an interior 34 and an exterior 36. The bellows 32 has an inner diameter ID and an outer diameter OD (see FIG. 5). The bellows 32 is configured to have a first mean effective diameter MED1 (see FIG. 5) when a pressure in the bellows 32 is below a mean effective diameter transition pressure 38 (see FIG. 4). The bellows 32 is configured to have a second mean effective diameter MED2 when the pressure in the bellows 32 is above the mean effective diameter transition pressure 38. The second mean effective diameter MED2 is larger than the first mean effective diameter MED1.

Figure 2:
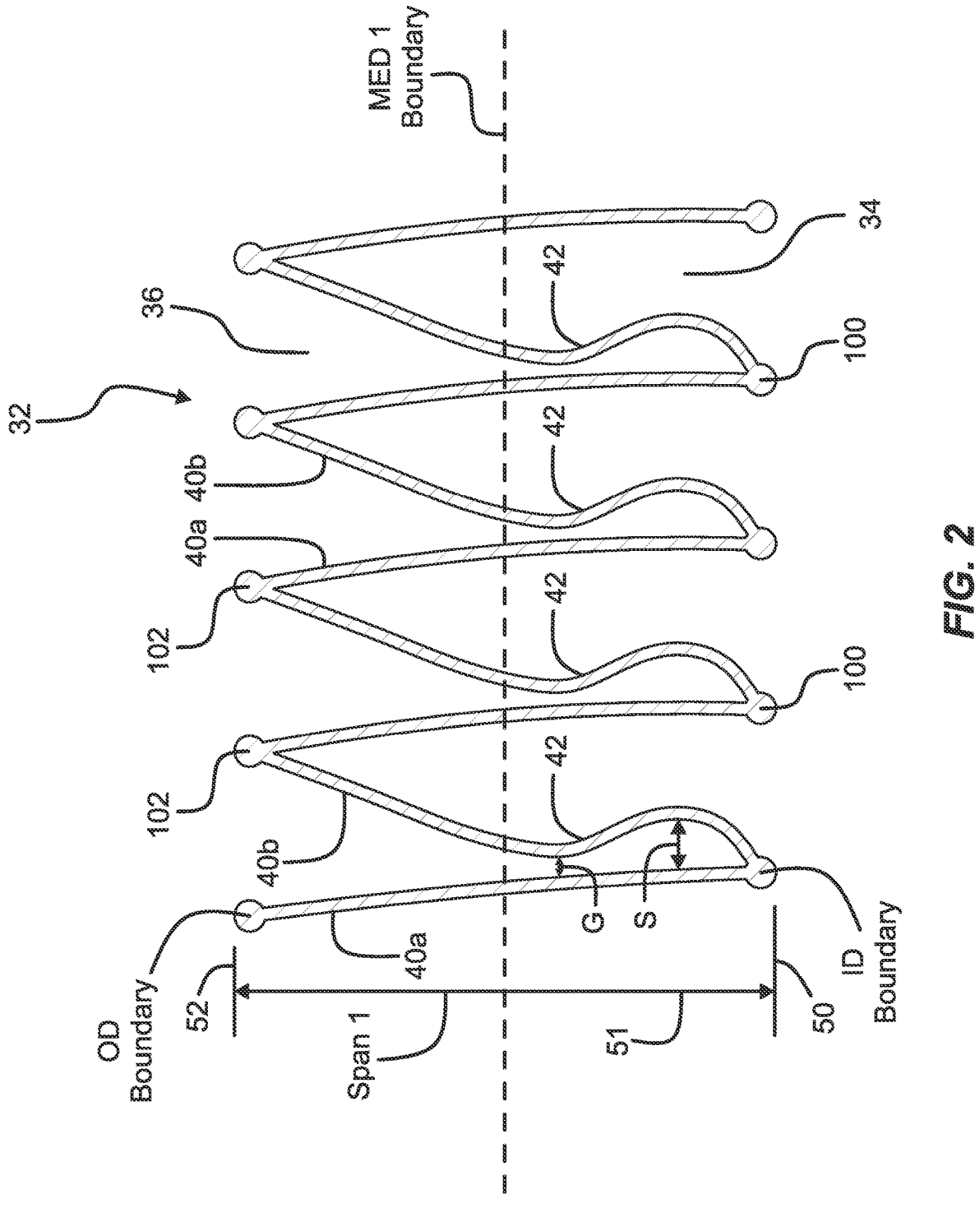
FIG. 2 depicts bellows of the bellows seal assembly of FIG. 1 when the bellows seal assembly is sealing an operating system that is being operated at a state in which a pressure within the bellows is below an MED transition pressure.

Referring to FIG. 2, the bellows 32 includes bellows plates 40a, 40b that in certain examples are welded together at inner and outer edges. The plates can be arranged in convolutions. The plates 40a, 40b can have different configurations from one another. In one example, the plates 40b include bump portions 42 at mid-span locations 108 (see FIG. 3) along convolution spans of the plates. In certain examples, the bellows plates or selected ones of the bellows plates can have different thicknesses by design. Depending on the application, the bellows 32 may terminate at either the inner diameter ID or outer diameter. In some examples, the bellows 32 may include an adapter plate which may terminate at the inner diameter ID (See FIGS. 1 and 8) or outer diameter ID (Shown in FIG. 7) and may be welded to the housing member 30.

The bellows 32 is configured such that the pairs of adjacent bellows plates 40a, 40b do not contact each other at the mid-span locations of the bump portions 42 when the bellows has the first mean effective diameter MED1 and the pairs of adjacent bellows plates 40a, 40b do contact each other at the mid-span locations 108 (see FIG. 3) when the bellows 32 has the second mean effective diameter MED2. When the bellows plates 40a, 40b do not contact, a span 51 (i.e., a convolution span) for determining the first mean effective diameter MED1 is provided between an inner boundary 50 corresponding to the inner diameter ID of the bellows 32 and an outer boundary 52 corresponding to the outer diameter OD of the bellows 32. The MED remains relatively constant below the mean effective diameter transition pressure 38 (see MED1 zone at FIG. 4) When the pressure in the bellows 32 exceeds the mean effective diameter transition pressure 38, sufficient pressure is present to force the pairs of bellows plates 40a, 40b together such that the bellows plates 40a, 40b contact each other at the midspan bump portions 42. Because of this contact, a new span 60 for determining the second mean effective diameter MED2 is established. The second mean effective diameter MED2 is greater than the first mean effective diameter (see MED2 zone verses MED1 zone of FIG. 4) such that more surface area is available for the pressure within the bellows 32 to act on thereby providing an increased sealing force multiplier.

The bellows 32 includes first welds 100 between the paired bellows plates 40a, 40b and second welds 102 for connecting adjacent sets of the paired bellows plates 40a, 40b together. As depicted, the first welds 100 define the inner diameter of the bellows 32 and the second welds 102 define the outer diameter of the bellows 32. In the depicted example, the bellows 32 is designed for use with a pressure generating system in which pressure is applied to the interior 34 of the bellows 32. The pressure is present in pressurized regions 104 of the bellows 32 and acts between the sets of paired bellows plates 40a, 40b rather than between the bellows plates 40a, 40b of each pair. Non-pressurized regions 106 are located between the bellows plates 40a, 40b of each plate pair. In this configuration, the bellows transitions from the smaller MED1 to the larger MED2 when the pressure in the bellows 32 exceeds the mean effective diameter transition pressure 38. In alternative examples, the bellows 32 can be designed for systems in which pressure acts on the exterior 36 of the bellows 32. In this type of example, the paired bellows plates 40a, 40b would be connected by the welds 102 defining the outer diameter of the bellows 32. In this type of example, the bellows 32 would transition from a larger MED to a smaller MED when the pressure acting on the exterior 36 of the bellows 32 exceeds the MED transition pressure.

Figure 3:
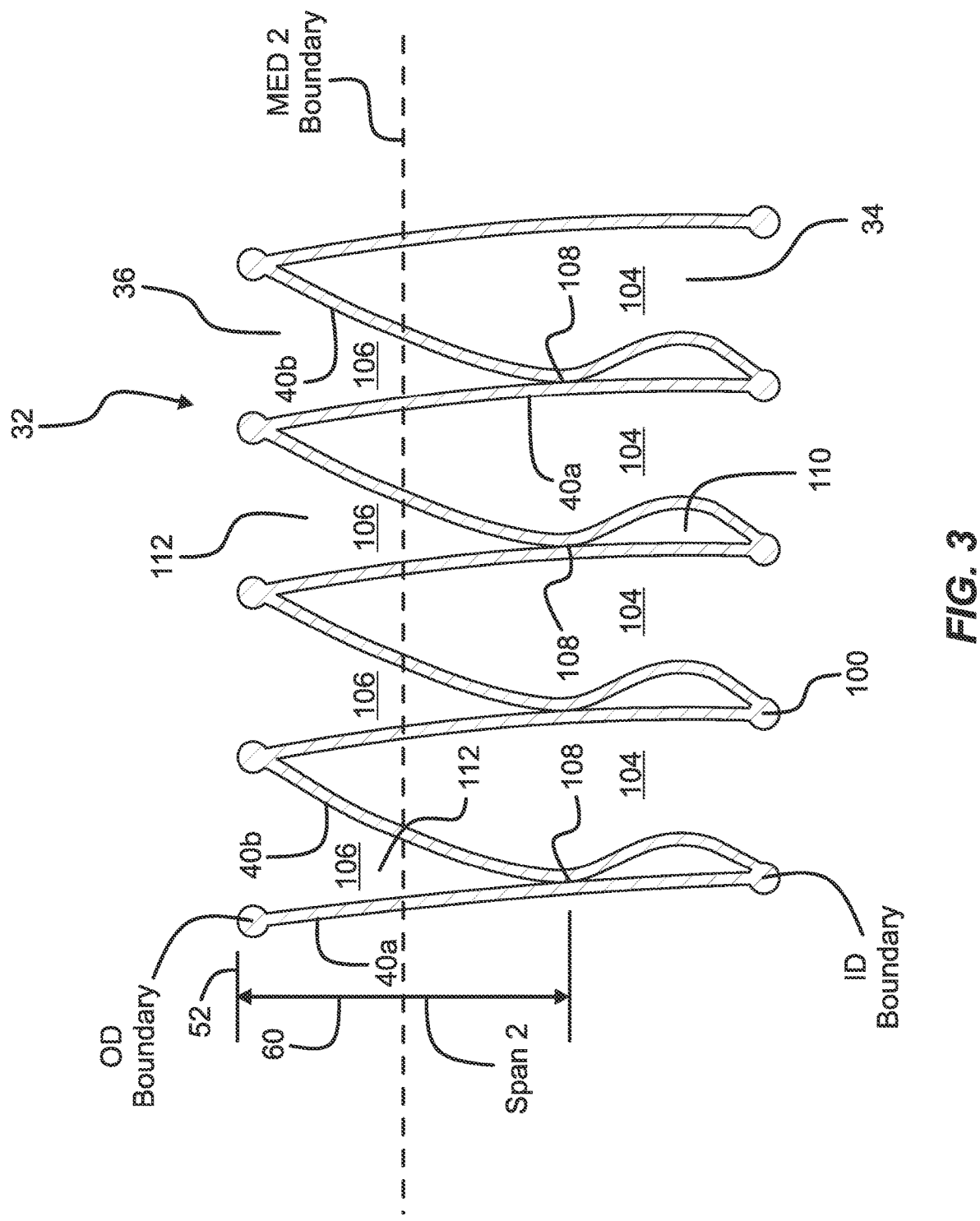
FIG. 3 depicts bellows of the bellows seal assembly of FIG. 1 when the bellows seal assembly is sealing an operating system that is being operated at a state in which a pressure within the bellows is above an MED transition pressure.

Referring to FIG. 3, the paired bellows plates 40a, 40b make contact at the mid-span locations which are depicted as discrete radial mid-span locations 108 along the radial length of the span 51. The bellows 32 is configured such that when the bellows plates 40a, 40b of each bellows plate pair contact one another at the mid-span locations 108, each bellows plate pair defines a first non-contact region 110 between the bellows plates 40a, 40b between the mid-span location 108 and the first weld 100 and a second non-contact region 112 between the bellows plates 40a, 40b of each plate pair between the mid-span location 108 and the second weld 102. The bellows plates 40a, 40b of each plate pair are shaped such that at the first non-contact region 110 the bellows plates 40a, 40b of each pair diverge from one another and then converge toward one another as the bellows plates 40a, 40b extend (e.g., extend radially) from the first weld 100 toward the mid-span location 108. In certain examples, the first non-contact regions 110 extend at least 50 percent or at least 75 percent of a distance (e.g., a radial distance) between the first weld locations 100 and the mid-span locations 108 and the second non-contact regions 112 extend a full distance between the mid-span locations 108 and the second welds 102 when the bellows plates 40a, 40b are contacting each other at the mid-span locations 108. In certain examples, the mid-span locations 108 are within a middle 70 percent or a middle 80 percent of the span 51.

Referring to FIG. 2, a pre-pressure gap G is defined between the bellows plates 40a, 40b of each bellows plate pair at the mid-span locations 108 when the bellows 32 is not subject to pressure, and the bellows plates 40a, 40b also define a pre-pressure plate spacing S at the first non-contact regions 110 (shown in FIG. 3) when the bellows 32 is not subject to pressure. In certain examples, the pre-pressure plate spacing S is larger than the pre-pressure gap G. In certain examples, the pre-pressure gap G is at constriction between the paired bellows plates 40a, 40b wherein a separation distance between the bellows plates 40a, 40b reduces and then expands as the bellows plates 40a, 40b extend along their spans 51. It will be appreciated that the pre-pressure gap G reduces to zero when the bellows 32 is subject to pressure at or above the MED transition pressure 38 while non-contact between the bellows plates 40a, 40b is concurrently maintained at the location of the pre-pressure plate spacing S.

Figure 6:
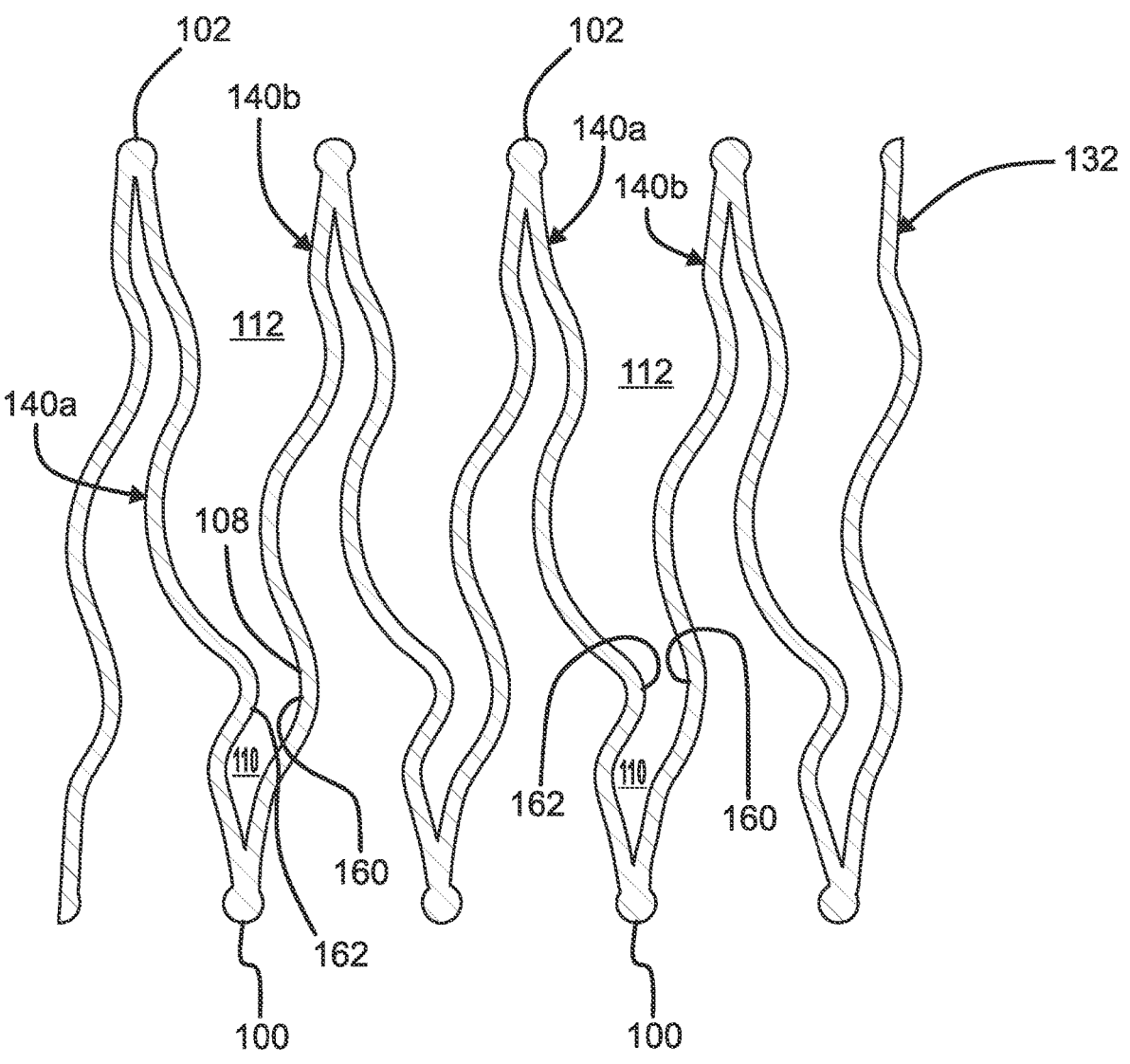
FIG. 6 depicts an alternative bellows plate geometry in accordance with the principles of the present disclosure.

FIG. 6 depicts a portion of an alternative bellows 132 having pairs of bellows plates 140a, 140b having an alternative geometry as compared to the bellows plates 40a, 40b. As depicted, bellows plate 140a of each bellows plate pair has a concave valley surface 160 adapted to engage a convex peak surface 162 of bellows plate 140b of each pair at the mid-span location 108. In certain examples, the curvatures 160, 162 do not match with the convex peak surface 162 having a sharper curvature as compared to the concave valley surface 160. In certain examples, the concave valley surface 160 has a radius of curvature that is at least 1.25 times or at least 1.5 times or at least 2 times or at least 3 times as large as a radius of curvature of the convex peak surface 162. In certain examples, the convex peak surface 162 is configured to make line contact with the concave valley surface 160. In certain examples, the convex peak surface 162 has a non-matching (e.g., non-complementary, non-nesting, etc.) shape compared to the concave valley surface 160 such that upon contact between the convex peak surface 162 and the concave valley surface 160 at the mid-span location 108, non-contact regions 110 (e.g., open spaces) between the convex peak surface 162 and the concave valley surface 160 are located both radially inwardly and radially outwardly with respect to the mid-span location 108.

Figure 7:
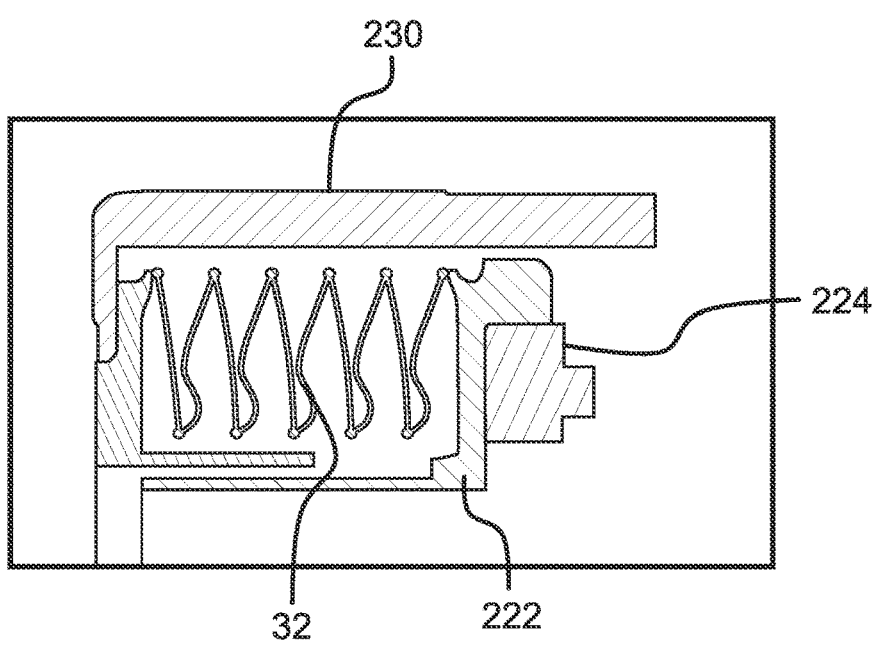
FIG. 7 depicts an alternative sealing ring, carrier and housing configuration.

It will be appreciated that bellows seal assembly 20 in accordance with the principles of the present disclosure can have different configurations. FIG. 7 schematically shows bellows 32 with an alternative sealing ring 224, ring carrier 222 and housing member 230.

Figure 8:
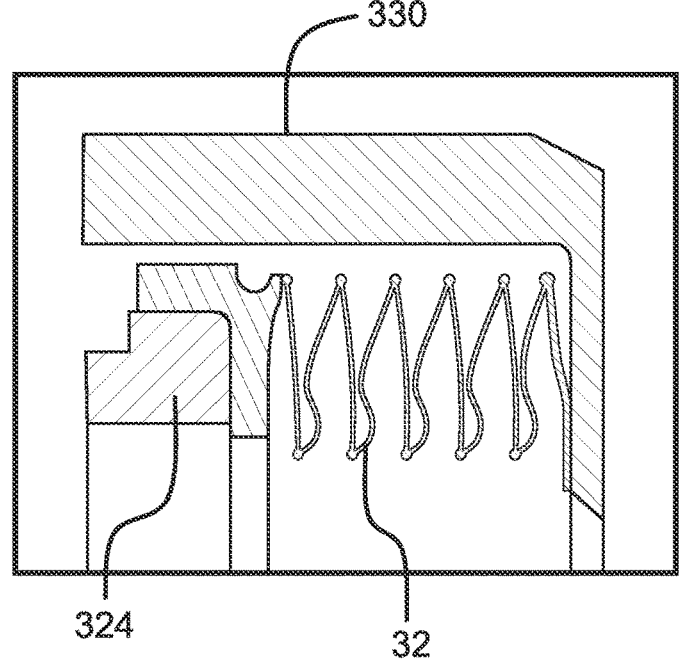
FIG. 8 depicts another an alternative sealing ring, carrier and housing configuration.

FIG. 8 schematically shows bellows 32 with another alternative sealing ring 324, ring carrier 322 and housing member 330.

As used herein, a mid-span location means a location that is somewhere along the span between the inner and outer welds (i.e., the convolution span). While a mid-span location can be at a center of the span, as depicted in various examples herein, it can also be offset from the center. A mid-span location is a location at an intermediate position along the span between the inner and outer welds. The number of convolutions can vary and can include one or more convolutions.

The various examples described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A bellows seal assembly comprising:
   a carrier;
   a sealing ring carried with the carrier, the sealing ring including an axial sealing face adapted to oppose a rotational member; and
   a bellows for applying sealing load to the sealing ring through the carrier, the bellows having an interior and an exterior, the bellows being configured to have a first mean effective diameter when a pressure applied to the bellows is below a mean diameter transition pressure, the bellows being configured to have a second mean effective diameter when the pressure in the bellows is above the mean diameter transition pressure, the bellows including bellows plates that each extend across a convolution span between first weld locations and second weld locations, the bellows plates being arranged in plate pairs with each plate pair including first and second plates connected at the first weld locations, adjacent ones of the plate pairs being connected together at the second weld locations, the bellows being configured such that the first and second plates of each plate pair do not contact each other at a mid-span location when the bellows has the first mean effective diameter and do contact each other at the mid-span location when the bellows has the second mean effective diameter, the bellows being configured such that when the first and second plates of each plate pair contact one another at the mid-span locations, first non-contact regions between the first and second plates of each plate pair are defined between the mid-span locations and the first welds and second non-contact regions between the first and second plates of each plate pair are defined between the mid-span locations and the second welds, wherein the first and second plates of each plate pair have different configurations from one another, and wherein the first plate of each plate pair is adapted to engage a convex peak surface of the second plate of each plate pair at the mid-span location when the bellows has the second mean effective diameter.

2. The bellows seal assembly of claim 1, wherein first pressurization regions of the bellows between the plate pairs are exposed to the pressure, and wherein second pressurization regions between the first and second plates of each plate pair are exposed to the pressure.

3. The bellows seal assembly of claim 1, wherein the first and second plates are shaped such that at the first non-contact regions the first and second plates of each pair diverge from one another and then converge toward one another as the first and second plates extend from the first weld locations toward the mid-span location.

4. The bellows seal assembly of claim 1, wherein the first non-contact regions extend at least 50 percent of a distance between the first weld locations and the mid-span locations and the second non-contact regions extend a full distance between the mid-span locations and the second welds when the first and second plates are contacting each other at the mid-span location.

5. The bellows seal assembly of claim 1, wherein the first non-contact regions extend at least 75 percent of a distance between the first weld locations and the mid-span locations and the second non-contact regions extend a full distance between the mid-span locations and the second welds when the first and second plates are contacting each other at the mid-span location.

6. The bellows seal assembly of claim 1, wherein a pre-pressure gap is defined between the first and second plates of each plate pair when the bellows is not subject to pressure, wherein the first and second plates define a pre-pressure plate spacing at the first non-contact regions when the bellows is not subject to pressure, and wherein the pre-pressure plate spacing is larger than the pre-pressure gap.

7. The bellows seal assembly of claim 1, wherein the first welds define an inner diameter of the bellows and the second welds define an outer diameter of the bellows.

8. The bellows seal assembly of claim 7, wherein the bellows is assembled in a system in which the pressure is applied within the bellows, and wherein the second mean effective diameter is larger than the first mean effective diameter.

9. The bellows seal assembly of claim 1, wherein the mid-span locations are within a middle 80 percent of the convolution span.

10. The bellows seal assembly of claim 1, wherein mid-span locations are within a middle 70 percent of the convolution span.

11. The bellows seal assembly of claim 1, wherein the first plate of each plate pair has a concave valley surface adapted to engage the convex peak surface of the second plate of each pair at the mid-span location.

12. The bellows seal assembly of claim 11, wherein the concave valley surface has a radius of curvature that is at least 1.25 times as large as a radius of curvature of the convex peak surface.

13. A bellows seal assembly comprising:

a carrier;

a sealing ring carried with the carrier, the sealing ring including an axial sealing face adapted to oppose a rotational member; and a bellows for applying sealing load to the sealing ring through the carrier, the bellows having an interior and an exterior, the bellows being configured with discrete mid-span contact locations configured to not contact when a pressure in the bellows is below a mean diameter transition pressure to cause the bellows to have a first mean effective diameter, the discrete mid-span contact locations also being configured to contact when the pressure in the bellows is above the mean diameter transition pressure to cause the bellows to transition to a second mean effective diameter, the second mean effective diameter being larger than the first mean effective diameter; the bellows including bellows plates, the bellows plates being arranged in plate pairs with each plate pair including first and second plates, wherein the first and second plates of each plate pair have different configurations from one another, and wherein the first plate of each plate pair is adapted to engage a convex peak surface of the second plate of each plate pair at the mid-span location when the bellows has the second mean effective diameter.

14. The bellows seal assembly of claim 13, wherein the bellows is configured such that when contact is made between paired bellows plates of the bellows at the mid-span contact locations, the mid-span contact locations are positioned radially between non-contact regions defined between the paired bellows plates.

15. The bellows seal assembly of claim 14, wherein the second plates have the convex peak portions that correspond to the mid-span contact locations, the convex peak portions being adapted to contact concave valley portions of the first plates at the mid-span contact locations, the concave valley portions having concave curvatures larger than corresponding convex curvatures of the convex peak portions such that the concave curvatures and the convex curvatures don't match.

16. A method for designing a bellows seal assembly used with a pressure-generating system, the method comprising:

designing a bellows with intentional mid-span contact locations between paired bellows plates of the bellows to cause the bellows to transition from a first mean effective diameter to a second mean effective diameter when the bellows is exposed to a predetermined pressure, wherein the bellows is designed such that the bellows is adapted to apply a customized first seal loading when the pressure-generating system is operating at a first condition in which a system pressure is below the predetermined pressure and is adapted to apply a customized second seal loading when the pressure-generating system is operating at a second condition in which a system pressure is above the predetermined pressure, the first and second seal loading being customized by selection of a radial placement of the mid-span locations along a convolution span of the bellows; wherein each plate of the paired bellow plates have different configurations from one another, and wherein a first plate of each plate pair is adapted to engage a convex peak surface of a second plate of each plate pair at the mid-span location when the bellows has the second mean effective diameter.

17. The method of claim 16, wherein the first seal loading is customized to enhance seal lift-off at start-up which constitutes the first condition and the second seal loading is customized to control a thickness of a dynamic fluid seal during normal operating conditions which constitutes the second condition.

18. The method of claim 16, wherein the radial placement of the mid-span locations can be varied to customize the bellows to different pressure-generating systems.

19. A device comprising:
a bellows including bellows plates that each extend across a convolution span between first weld locations and second weld locations, the bellows plates being arranged in plate pairs with each plate pair including first and second plates connected at the first weld locations, adjacent ones of the plate pairs being connected together at the second weld locations, the bellows being configured such that the first and second plates of each plate pair contact each other at a mid-span location when the first and second plates of each plate pair are forced together, the bellows being configured such that upon contact of the first and second plates of each plate pair at the mid-span locations first non-contact regions between the first and second plates of each plate pair are defined between the mid-span locations and the first welds and second non-contact regions between the first and second plates of each plate pair are defined between the mid-span locations and the second welds; wherein the bellows are configured to transition from a first mean effective diameter to a second mean effective diameter, wherein the first and second plates of each plate pair have different configurations from one another, and wherein the first plate of each plate pair is adapted to engage a convex peak surface of the second plate of each plate pair at the mid-span location when the bellows has the second mean effective diameter.

20. The device of claim 19, wherein the mid-span locations are within a middle 80 percent of the convolution span.

21. The device of claim 19, wherein the mid-span locations are within a middle 70 percent of the convolution span.

22. The device of claim 19, wherein the first plate of each plate pair has a concave valley surface adapted to engage the convex peak surface of the second plate of each pair at the mid-span location.

23. The device of claim 22, wherein the concave valley surface has a radius of curvature that is at least 1.25 times as large as a radius of curvature of the convex peak surface.

24. The device of claim 23, wherein the concave valley surface is configured to make line contact with the convex peak surface.

25. A device comprising:
a bellows including bellows plates that each extend across a convolution span between first weld locations and second weld locations, the bellows plates being arranged in plate pairs with each plate pair including first and second plates connected at the first weld locations, adjacent ones of the plate pairs being connected together at the second weld locations, the bellows being configured such that the first and second plates of the plate pairs define mid-span contact locations between the first and second plates of the plate pairs; wherein the bellows are configured to transition from a first mean effective diameter to a second mean effective diameter, wherein the first and second plates of each plate pair have different configurations from one another, and wherein the first plate of each plate pair is adapted to engage a convex peak surface of the second plate of each plate pair at the mid-span location when the bellows has the second mean effective diameter.

26. The device of claim 25, wherein the mid-span contact locations are within a middle 80 percent of the convolution span.

27. The device of claim 25, wherein the mid-span contact locations are within a middle 70 percent of the convolution span.

28. The device of claim 25, wherein the first plate of each plate pair has a concave valley surface adapted to engage the convex peak surface of the second plate of each pair at the mid-span location.

29. The device of claim 28, wherein the concave valley surface has a radius of curvature that is at least 1.25 times as large as a radius of curvature of the convex peak surface.

30. The device of claim 28, wherein the concave valley surface is configured to make line contact with the convex peak surface.

31. A device comprising:
a bellows including bellows plates that each extend across a convolution span between first weld locations and second weld locations, the bellows plates being arranged in plate pairs with each plate pair including first and second plates connected at the first weld locations, adjacent ones of the plate pairs being connected together at the second weld locations, the bellows being configured such that the first plates of the plate pairs define mid-span concave valley surfaces that oppose mid-span convex peak surfaces defined by the second plates of the plate pairs, each concave valley surface having a radius of curvature that is at least 1.25 times as large as a radius of curvature of opposing convex peak surface; wherein the bellows are configured to transition from a first mean effective diameter to a second mean effective diameter, wherein the first and second plates of each plate pair have different configurations from one another, and wherein the first plate of each plate pair is adapted to engage a convex peak surface of the second plate of each plate pair at the mid-span location when the bellows has the second mean effective diameter.

* * * * *